(12) United States Patent
Burki et al.

(10) Patent No.: US 12,276,645 B2
(45) Date of Patent: Apr. 15, 2025

(54) METHODS FOR QUANTIFICATION OF CARBOHYDRATES

(71) Applicant: Biological E Limited, Telangana (IN)

(72) Inventors: Rajendar Burki, Telangana (IN); Ramesh Venkat Matur, Telangana (IN); Narender Dev Mantena, Telangana (IN); Mahima Datla, Telangana (IN)

(73) Assignee: Biological E Limited (IN)

( * ) Notice: Subject to any disclaimer, the term of this patent is extended or adjusted under 35 U.S.C. 154(b) by 511 days.

(21) Appl. No.: 17/764,351

(22) PCT Filed: Sep. 30, 2020

(86) PCT No.: PCT/IN2020/050841
§ 371 (c)(1),
(2) Date: Mar. 28, 2022

(87) PCT Pub. No.: WO2021/064748
PCT Pub. Date: Apr. 8, 2021

(65) Prior Publication Data
US 2022/0390423 A1     Dec. 8, 2022

(30) Foreign Application Priority Data
Oct. 1, 2019 (IN) .............................. 201941039796

(51) Int. Cl.
*G01N 31/22* (2006.01)
*G01N 21/31* (2006.01)
*G01N 21/78* (2006.01)

(52) U.S. Cl.
CPC ............. *G01N 31/22* (2013.01); *G01N 21/31* (2013.01); *G01N 21/78* (2013.01)

(58) Field of Classification Search
CPC ......... G01N 31/22; G01N 21/31; G01N 21/78
See application file for complete search history.

(56) References Cited

U.S. PATENT DOCUMENTS

2009/0317860 A1* 12/2009 Kawate .................. G01N 31/22
435/34

FOREIGN PATENT DOCUMENTS

EP          2290366        3/2011
IN     5856/DELNP/2009    3/2008

OTHER PUBLICATIONS

Dreywood, Roman "Qualitative Test for Carbohydrate Material," *Industrial and Engineering Chemistry, Analytical Edition*, 18:499 (publication date: Aug. 1946).
Gogola et al., "Quantification of capsular polysaccharide of *Streptococcus pneumoniae* serotype14 in culture broth samples," *Analytical Biochemistry*, 421:250-255 (epublication date: Dec. 1, 2011).
(Continued)

*Primary Examiner* — Brian R Gordon
*Assistant Examiner* — Dwan A Gerido
(74) *Attorney, Agent, or Firm* — Perkins Coie LLP

(57) ABSTRACT

The present invention provides a colorimetric based method for quantifying carbohydrates in a given aqueous sample. The method provided by the invention uses 2-Phenoxyethanol as a novel reagent for quantifying carbohydrates in a given sample. The present invention is a rapid, sensitive, simple and direct method for carbohydrate quantification.

10 Claims, 2 Drawing Sheets

(56) References Cited

OTHER PUBLICATIONS

International Search Report and Written Opinion dated Sep. 1, 2021 for International Application No. PCT/IN2020/050841.
Talaga, Philippe et al., "Development of a high-performance anion-exchange chromatography with pulsed-amperometric detection based quantification assay for pneumococcal polysaccharides and conjugates," *Vaccine*, 20(19-20):2474-84 (publication date: Jun. 7, 2002).
Turula, Vincent et al., "Automation of the Anthrone Assay for Carbohydrate Concentration Determinations," *Anal. Chem.*, 82:1786-1792 (publication date: Feb. 2, 2010).
Wu et al., "Simultaneous determination of 21 preservatives in cosmetics by ultra performance liquid chromatography," International Journal of Cosmetic Science, 30(5):367-372 (2008).
Zablackis et al., "Chapter 7 Bacteroa; Polysaccharide Vaccines: AnalyticalPerspectives," Vaccine Analysis: Strategies, Principles, and Control pp. 271-299, 2015 edition.

\* cited by examiner

METHODS FOR QUANTIFICATION OF CARBOHYDRATES

RELATED APPLICATIONS

This application is a 35 USC § 371 National Stage application of International Application No. PCT/IN2020/050841, entitled "METHODS FOR QUANTIFICATION OF CARBOHYDRATES," filed on Sep. 30, 2020, which claims the benefit of Indian patent Application No. 201941039796, filed Oct. 1, 2019, which are hereby incorporated by reference herein in their entirety.

FIELD OF THE INVENTION

The present invention relates to methods for the estimation of carbohydrates. More specifically, the present invention relates to methods for quantification of carbohydrates using aromatic ethanol when carbohydrates are present in low concentration in pharmaceuticals, biopharmaceuticals and biologicals.

BACKGROUND OF THE INVENTION

Quantification of carbohydrate or polysaccharide content is an essential analytical procedure in food and beverages, nutraceuticals, agricultural products, medicinal products and vaccine development. Polysaccharides are generally quantified by biochemical assay using anthrone reagent and glucose as standards. Other biochemical methods using reagents such as orcinol, or phenol sulphuric acid with colorimetric reaction are also largely been used for polysaccharide estimation. Several modifications of these methods (concentration of anthrone reagent and $H_2SO_4$, heating time and temperature, etc.) were reported earlier for improving the sensitivity of the colorimetric method. The modifications were aimed at enhancement of the colour development of the anthrone-furfural complex, which improves the optical density signal, thereby enhancing quantification sensitivity of the assay. On the other hand, the colour development is low with these methods for analysing polysaccharides containing mixtures of uronic acids (Glucoronic acid and Galacturonic acid) and hexosamines (Fucosamine, Glucosamine, Galactosamine, Mannosamine, Pneumosamine). These methods do not generate optimum colour complexes and suffer from low sensitivity making them less desirable for estimating such carbohydrates/polysaccharides.

During carbohydrate quantification in presence of sulphuric acid, Hexoses and Pentoses are hydrolysed and converted to 5-Hydroxymethyl furfural and furfural respectively. These molecules generated by acid hydrolysis then react with Anthrone or Phenol to form the colour complex, which is then measured for optical density (OD) at a specific wavelength. The absorption maxima for the Anthrone-Furfural complex is at 625 nm and that of the Phenol-Furfural complex is at 490 nm. The intensity of the absorbance in both these methods varies with the composition of the polysaccharide, as different polysaccharides contain different sugars such as Hexoses, Pentoses, Uronic acids, Hexosamines, Pentosamines, Glycolides, Glycoproteins and Nucleic Acids, etc., and in different proportions.

In conjugate vaccines, polysaccharides are conjugated to a carrier protein and controlling each polysaccharide amount in the prescribed dose is critical for maintaining the quality and efficacy of the vaccine. Accurate quantification of polysaccharides at the microgram level is very essential in developing the vaccine. Polysaccharides are complex mixtures of Hexoses, Pentoses, Uronic acids and Hexosamines.

For quantification of the total polysaccharide content of pneumococcal serotypes or their components (Methyl pentoses, Uronic Acids, Hexosamines, O-Acetyl, Phosphorous and Nitrogen) various biochemical methods were reported. Majority of them use acid hydrolysis to release the monosaccharides, which are quantified using high-performance anion-exchange chromatography (HPAEC) with a pulsed amperometric detector (PAD), or acid hydrolysis along with derivatization followed by quantification of monosaccharides using Gas chromatography connected to mass selective detector (GC-MSD).

Another method reported for the quantification of pneumococcal polysaccharides containing hexosamines is based on acid hydrolysis, re-N-acetylation followed by labelling the hexosamines with 2-aminobenzamide by reductive amination followed by RP-HPLC with fluorescence detector. Although these methods are sensitive and offer accuracy but they are laborious and time consuming.

Indian Patent Application No. 5856/DELNP/2009 discloses quantification of polysaccharide using automated colorimetric assay using sulphuric acid and anthrone reagent or sulphuric acid and tetraborate reagent.

EP 2290366 A1 discloses the analysis of saccharide vaccines without interference between the monosaccharides and from any other saccharide materials in the composition, comprising the process of quantifying monosaccharides (sialic acid, galactose and glucose) by acid hydrolysis using trifluoroacetic acid (TFA) for Neisseria meningitidis serogroups C, W135 and Y.

Roman Dreywood, (Qualitative test for carbohydrate material: August 1946), discloses the qualitative analysis of carbohydrate material using a solution of anthrone in concentrated sulphuric acid, which gives a permanent green coloration with carbohydrate material.

Philippe et al., (Vaccine 20 (2002) 2474-2484) discloses quantification assay for pneumococcal polysaccharides and conjugates using HPAEC-PAD where pneumococcal polysaccharides were subjected to 3 different hydrolysis methods: trifluoro acetic acid (TFA), methanolysis followed by TFA hydrolysis and hydrofluoric acid followed by TFA hydrolysis.

Vincent et al., (Anal. Chem. 2010, 82, 1786-1792), discloses the automation of the anthrone assay for determination of carbohydrate concentration wherein the polysaccharide test samples and standards are heated in a concentrated mixture of anthrone in sulphuric acid at absorbance 625 nm.

Verônica et al., (Analytical Biochemistry 421 (2012) 250-255), discloses the quantification of capsular polysaccharide of Streptococcus pneumoniae serotype 14 in culture broth samples using phenol-sulfuric, HPSEC (10 mM $Na_2HPO_4$, 0.15 M NaCl, pH 7.5), competitive ELISA (o-phenylenediamine dihydrochloride in phosphate-citrate buffer, pH 5.0, and 0.05% hydrogen peroxide were added and the reaction was stopped with 4.5 M $H_2SO_4$, and the absorbance at 492 nm), and sandwich ELISA methods, wherein sandwich ELISA was found to be the method with the best reproducibility and sensitivity and the least susceptible to interferences.

Earl Zablackis et al., (Vaccine Analysis: Strategies, Principles, and Control pp 271-299, 2015) discloses bacterial polysaccharide vaccines and its analytical perspective where bacterial polysaccharides are quantified by colorimetric methods wherein the polysaccharide is heated with sulphuric acid/borate solution to release the monosaccharide (uronic acid) and then cooled and carbazole/ethanol solution is added and absorbance read at 530 nm. Polysaccharide (hexosamines) is digested with HCl, cooled and then reacted with acetyl acetone/sodium carbonate and then reacted with Ehrlich's reagent and absorbance read at 530 nm.

The above prior art discloses various method to quantify the polysaccharides. However, these methods suffer from various infirmities and hence, there is a need for development of new method which enhances the colour development and consequently, enhances the sensitivity. The enhanced sensitivity may provide proper estimation of the carbohydrates when present in low concentration in any sample, including, but not limited to, pharmaceuticals, biopharmaceuticals, biologicals, cosmetics, environmental matrices, food, forensic samples, industrial chemicals, and nutraceuticals.

OBJECTIVE OF THE INVENTION

It is the main objective of the invention to develop a simple and direct method for the quantification of polysaccharides with higher sensitivity.

It is also the objective of the invention to develop a simple and direct method for the quantification of polysaccharides when present in low concentration in a sample such as pharmaceuticals, biopharmaceuticals, biologicals, cosmetics, environmental matrices, food, forensic samples, industrial chemicals, and nutraceuticals.

SUMMARY OF THE INVENTION

In one aspect, the invention relates to a method for quantification of carbohydrates using an aromatic ethanol, such as 2-Phenoxyethanol (2-PE).

The present invention provides a colorimetric based method for the quantification of carbohydrates in an aqueous sample, the method comprising the steps of:
 a. admixing sulphuric acid and 2-Phenoxyethanol with the aqueous sample containing carbohydrates to obtain a reaction mixture;
 b. incubating the reaction mixture to form a coloured complex; and
 c. measuring the absorbance of the coloured complex to quantify the amount of carbohydrate present in the aqueous sample.

In one aspect, the present invention relates to a method for estimation of carbohydrates such as, monosaccharides, disaccharides, polysaccharides, uronic acids, hexosamines and their derivatives and combination thereof.

In yet another aspect, the invention also provides a kit for the quantification of carbohydrates in a sample.

DETAILED DESCRIPTION OF THE INVENTION

Figure 1:
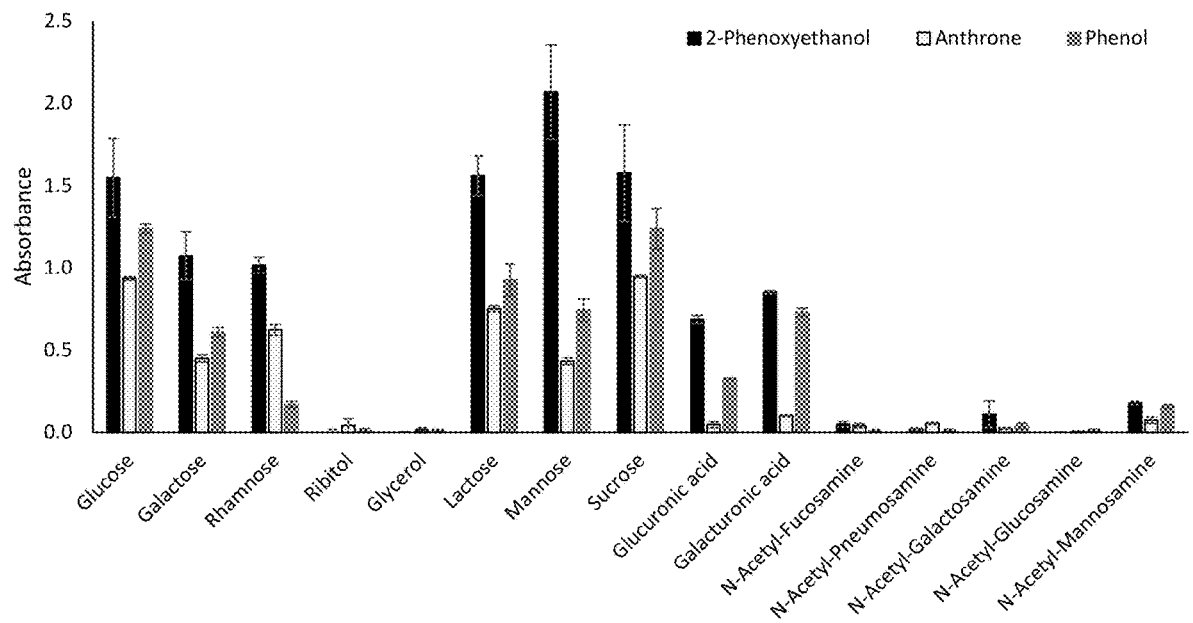
FIG. 1 illustrates absorbance of Monosaccharides upon reacting with 2-PE (500 nm), anthrone (625 nm) and Phenol (490 nm) reagents.

The present invention relates to methods for estimation of carbohydrates using an aromatic ethanol such as 2-phenoxy-ethanol. More specifically, the present invention relates to methods for quantification of carbohydrates using 2-phenoxy-ethanol when carbohydrates are present in low concentration in pharmaceuticals, biopharmaceuticals like vaccines, protein formulations, peptide formulations and other biologicals.

In an embodiment, the present invention relates to the estimation of carbohydrates such as monosaccharides, disaccharides, polysaccharides, uronic acids, hexosamines and their derivatives and combination thereof in an aqueous sample.

In an embodiment of the present invention, monosaccharide includes, but not limited to, glucose, galactose, rhamnose, mannose, arabinose, xylose, fructose, ribose and their derivatives and combination thereof.

In an embodiment of the invention, disaccharide includes, but not limited to, sucrose, lactose, maltose, trehalose, cellobiose and their derivatives and combination thereof.

In an embodiment of the invention, uronic acid includes, but not limited to glucuronic acid, galacturonic acid, mannuronic acid and their derivatives and combination thereof.

In an embodiment of the invention, hexosamine includes, but not limited to, Fucosamine, Glucosamine, Galactosamine, Mannosamine, Pneumosamine, N-Acetyl L-fucosamine and N-Acetyl L-pneumosamine, N-Acetyl Glucosamine, N-Acetyl-Galactosamine N-Acetyl Mannosamine and their derivatives and combination thereof.

In one embodiment, the present invention relates to a method for quantification of polysaccharides such as Pneumococcal polysaccharides, Meningococcal polysaccharides, VI polysaccharide, O2 polysaccharide and other carbohydrates such as Cellulose, Starch, Chitin, Dextran and Pullulan and the like.

In an embodiment of the present invention, pneumococcal polysaccharides are prepared as disclosed in PCT Publication Number WO2016/174683 A1 and the structure thereof is deduced by $^1$H NMR analysis. The purified capsular polysaccharides are found to be in compliance with commercially available specified composition of monosaccharides such as Glucose, Galactose, Rhamnose; Uronic Acids such as Glucuronic acid and Galacturonic Acid; Hexosamines such as N-Acetyl L-fucosamine and N-Acetyl L-pneumosamine, N-Acetyl Glucosamine, N-Acetyl-Galactosamine; O-Acetyl, Phosphorous and Nitrogen content.

The inventors of the present invention during their continuous efforts to develop high sensitive methods for the quantification of polysaccharides have developed a method for quantification of carbohydrates using aromatic alcohol such as 2-PE (2-Phenoxyethanol). The developed method provides higher specificity and sensitivity over other methods, such as quantification with anthrone or phenol, and contributes to the quantification of a broad range of carbohydrates, sugars and/or polysaccharides in a wide range of samples.

2-PE reacts with the fural or 5-Hydroxymethylfurfural formed from acid hydrolysis of polysaccharide and has an absorbance maximum at 500 nm. Additionally, the colour development in this method is not impaired by uronic acid containing polysaccharides. Further, polysaccharide-protein conjugates can be quantified using the present invention with increased sensitivity over anthrone reagent. The polysaccharides isolated from bacteria (*Streptococcus pneumoniae*,) sugars and their respective acids showed enhanced reactivity with 2-PE thus improving the method sensitivity. The method is simple, direct and can be used as a routine technique for any type of polysaccharide quantitation. Overall, the higher sensitivity of the methods of the present invention would contribute to the quantification of a broad range of carbohydrates, sugars and/or polysaccharides with higher sensitivity over other reported methods.

In an embodiment, the present invention provides a method for quantification of carbohydrates in an aqueous sample comprises the steps of:
a. admixing sulphuric acid and 2-Phenoxyethanol with the aqueous sample to obtain a reaction mixture;
b. incubating the reaction mixture to form a coloured complex; and
c. measuring the absorbance of the coloured complex to quantify the amount of carbohydrate present in the aqueous sample.
  In another embodiment, the quantity of carbohydrates in the sample is proportional to the measured absorbance of the coloured complex.

In a more preferred embodiment of the invention, the carbohydrate sample is treated with concentrated sulphuric acid to obtain the reaction mixture.

In an embodiment of the invention, the volume of sulphuric acid added to the carbohydrate containing aqueous sample ranges from about 1 to 3 times the volume of the carbohydrate containing aqueous sample.

The term "about" as used herein contemplates a range of values for a given number of ±25% the magnitude of that number. In certain embodiments, the term "about" contemplates a range of values for a given number of ±20%, ±15%, ±10%, or ±5% the magnitude of that number.

In another embodiment of the invention, the volume of sulphuric acid added to the carbohydrate containing aqueous sample is twice the volume of the carbohydrate containing aqueous sample.

In an embodiment of the invention, the concentration of 2-Phenoxyethanol ranges from about 0.1% v/v to 2.5% v/v with respect to the reaction mixture In an embodiment of the invention, the reaction mixture is incubated at a temperature ranging from about 80° C. to 110° C.

In another embodiment, the reaction mixture is incubated at a temperature of about 90° C.

In an embodiment of the invention, the reaction mixture is incubated for a time period ranging from about 1 minute to 10 minutes.

In another embodiment, the reaction mixture is incubated for a time period of about 5 minutes.

In an embodiment of the invention, the absorbance of the coloured complex is measured in a wavelength ranging from about 490 nm to 510 nm.

In another embodiment of the invention, the absorbance of the coloured complex is measured at a wavelength of 500 nm.

In an embodiment of the invention, the aqueous sample quantified is a pure carbohydrate sample.

In another embodiment of the invention, the aqueous sample quantified is an impure carbohydrates sample. The impurities include, but are not limited to, nucleic acids, proteins, lipids, residual reagents, excipients or a combination thereof.

It was found that the method of the present invention is very specific to carbohydrates in presence of different impurities and formulation excipients, indicating the specificity of the assay.

"Limit of Detection," as that term is used herein, includes the lowest concentration at which one can identify a sample as containing a molecule of the substance of interest.

In an embodiment of the present invention, the Limit of Detection (LOD) is less than about 4 µg/mL.

"Limit of Quantification", as used herein, refers to a point where measurements become quantitatively meaningful.

In an embodiment of the present invention, the Limit of Quantification (LOQ) is at least 6 µg/mL.

In another embodiment of the present invention, the Limit of Quantification (LOQ) is at least 8 µg/mL.

In an embodiment, the method of the present invention is used to quantify carbohydrates in a vaccine or a biopharmaceutical sample.

In an embodiment of the present invention, carbohydrate content in monoconjugate and multivalent Pneumococcal Conjugate Vaccine (PCV) drug product is quantified.

In another embodiment of the present invention, the total carbohydrate content was quantified for monoconjugate and multivalent PCV drug product wherein pneumococcal serotype such as 1, 2, 3, 4, 5, 6A, 6B, 6C, 7F, 8, 9N, 9V, 10A, 1 1A, 12F, 14, 15A, 15B, 15C, 16F, 17F, 18C, 19F, 19A, 20A, 20B, 22F, 23A, 23B, 23F, 24B, 24F, 31 , 33F, 34, 35B, 35F, 38, 39 and 45. were prediluted to 4-100 µg/mL prior to being subjected for analysis.

The multivalent pneumococcal conjugate vaccine may be a 10 valent, 12 valent, 13 valent, 14 valent, 15 valent, 17 valent, 18 valent, 19 valent, 20 valent, 22 valent, 23 valent, 24 valent, 25 valent, 27 valent, 28 valent, 29 valent, 30 valent pneumococcal vaccine composition.

In yet another embodiment, the method of the present invention is applied to quantify the polysaccharide in monovalent and multivalent vaccine products for interference and spike recovery evaluation.

In yet another embodiment, the multivalent Pneumococcal conjugate vaccine adsorbed with aluminium phosphate (equivalent to ~70 µg/mL of polysaccharides) is subjected to total saccharide content analysis using methods of the present invention.

In an embodiment of the present invention, carbohydrate content in multivalent meningococcal conjugate drug product containing polysaccharides from *Neisseria meningitidis* serogroups A, C, W135, X and Y is quantified.

In an embodiment of the present invention, carbohydrate content in monovalent and bivalent typhoid conjugate drug product containing Vi polysaccharide and O2 polysaccahrides from *Salmonella typhi* and *Salmonella paratyphi* is quantified.

In an embodiment, this invention also includes a kit for quantifying carbohydrates in an aqueous sample.

In an embodiment, the kit for quantifying carbohydrates comprises of sulphuric acid, 2-Phenoxyethaol or a combination thereof.

In another embodiment, the invention provides the use of 2-Phenoxyethanol for quantification of carbohydrates in a sample.

In another embodiment, the invention provides the use of 2-Phenoxyethanol for quantification of carbohydrates in a sample, wherein said carbohydrate is selected from a group comprising monosaccharides, disaccharides, polysaccharides, uronic acids, hexosamines, their derivatives and combinations thereof.

The following examples are provided to illustrate the invention and are merely for illustrative purpose only and should not be construed to limit the scope of the invention.

EXAMPLES

Example 1: Estimation of Monosaccharides and Polysaccharides by Three Different Methods as Under a. 2-PE-Sulphuric Acid Assay.

Carbohydrates such as Glucose, Galactose, Rhamnose, Ribitol, Glycerol, Lactose, Mannose, Sucrose, Glucuronic acid, Galacturonic acid, N-Acetyl L-fucosamine and N-Acetyl L-pneumosamine, N-Acetyl Glucosamine, N-Acetyl-Galactosamine, and N-Acetyl Mannosamine,Pullulan 800, and Pneumococcal polysaccharides from serotypes 1, 3, 5, 6B, 9V, 14, 19F, 22F, 23F were diluted to 20 μg in 250 μL MilliQ water, based on the dry weight and hydrolysed in the presence of concentrated $H_2SO_4$ to form monosaccharides or their derivatives which in hot acidic medium gets dehydrated to form hydroxymethyl furfural. These hydroxymethyl furfural structures then reacted with phenol reagent to form an orange-yellow coloured complex which gives a maximum absorbance at 500 nm.

The reaction of 2-phenoxyethanol with sugars in presence of $H_2SO_4$ (Based on Molisch's Test Reaction) is depicted in the following scheme:

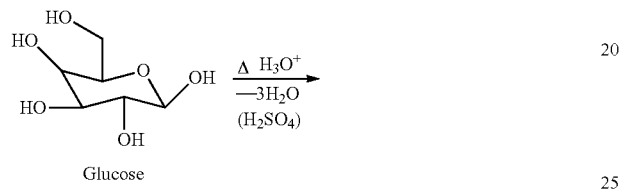

Glucose

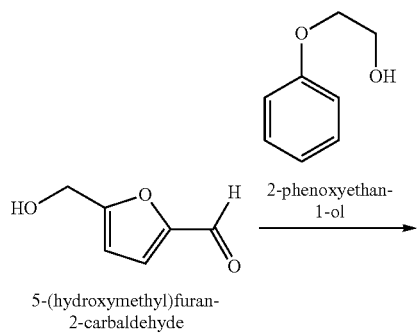

5-(hydroxymethyl)furan-2-carbaldehyde 2-phenoxyethan-1-ol

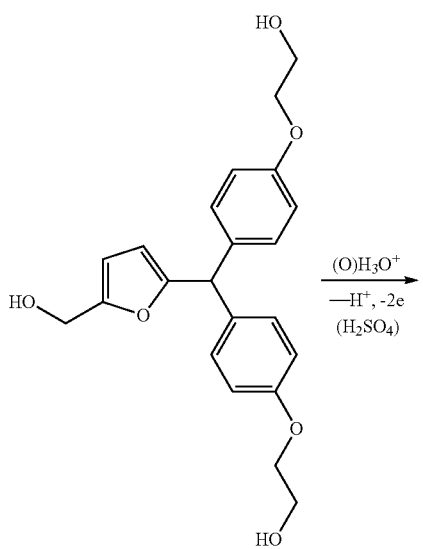

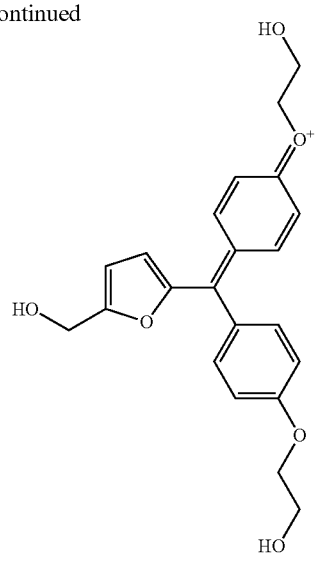

Yellow orange dye
wavelength max 500 nm

250 μL (80 μg/mL) of the diluted monosaccharides and polysaccharides were dispensed in triplicates into clean and dry glass tubes and 250 μL of reagent/MilliQ water was taken in triplicates for blank correction. 10 μL of 98% of 2-PE and 500 μL of $H_2SO_4$ were added to all the tubes and vortexed gently. Tubes were incubated in a water bath at 90° C. for 5 minutes. Thereafter the tubes were cooled to room temperature and 250 μL were transferred into micro-plate and the absorbance was measured at 500 nm using a plate reader.

b. Phenol-Sulphuric Acid Assay.

All monosaccharides and polysaccharides were diluted to 20 μg in 165 μL MilliQ water, based on the dry weight and hydrolysed in the presence of 500 μL of concentrated $H_2SO_4$ to form monosaccharides or their derivatives which in hot acidic medium gets dehydrated to form hydroxymethyl furfural. These hydroxymethyl furfural structures then reacts with phenol reagent to form an orange-yellow coloured complex which gives a maximum absorbance at 490 nm.

Each standard of 0-20 μg was taken in a clean glass tube and 100 μL of 5% phenol reagent was added and thereafter incubated for 5 minutes at 90° C. in open tubes and 250 μL were transferred into microplate, followed by reading the absorbance using plate reader at 490 nm.

c. Anthrone-Sulphuric Acid Assay.

All monosaccharides and polysaccharides were diluted to 20 μg in 250 μL, based on the dry weight and hydrolysed in presence of $H_2SO_4$ to form monosaccharides or their derivatives which in hot acidic medium gets dehydrated to form hydroxymethyl furfural. These hydroxymethyl furfural structures then react with anthrone reagent to form a green coloured complex which gives a maximum absorbance at 625 nm. 250 μL (80 μg/mL) in triplicates were dispensed into a clean glass tube and 500 μL of anthrone reagent were added followed by incubation for 5 minutes at 90° C. and the absorbance was measured using plate reader at 625 nm.

In all above listed three methods, the final reaction volumes were ~760 μL and 250 μL was taken for absorbance measurements in microplate.

TABLE 1

Carbohydrate Estimation Methods

| S. No. | Method | Reagent | λ max (Absorbance) |
|---|---|---|---|
| 1. | 2-PE-Sulphuric Acid Assay | Aromatic Phenoxy Ethanol | 500 nm |
| 2. | Phenol-Sulphuric Acid Assay | Aromatic Phenol Component | 490 nm |
| 3. | Anthrone-Sulphuric Acid Assay | Tricyclic Aromatic Component | 625 nm |

Results

Absorbance of Monosaccharides

The absorbance of monosaccharides upon reacting with 2-PE (500 nm), anthrone (625 nm) and phenol (490 nm) reagents were illustrated in FIG. 1.

In presence of $H_2SO_4$, all monosaccharides get hydrolysed to form hydroxymethylfurfural. These hydroxymethyl furfural structures when reacted with anthrone formed a green coloured complex having an absorbance maximum at 625 nm. Similarly, when hydroxymethyl furfural structures reacted with 2-PE gave an orange-yellow colour complex having absorbance maxima at 500 nm. The colour complex formed with Glucuronic acid and Galacturonic acid upon reacting with anthrone, has low absorbance (0.05 and 0.10 OD), whereas absorbance using 2-PE as a reagent the OD (Optical Density) units were 0.69 and 0.85 respectively. Hexoses, such as Glucose, Galactose and Mannose ODs were 1.55, 1.07 and 2.07 with 2-PE and with anthrone 0.93, 0.45 and 0.43 respectively. Similarly, for Rhamnose, i.e. methyl pentose, the OD with 2-PE was 1.02 and 0.62 with anthrone. The ODs for N-Acetylated amines (FucNAc; GlucNAc; GalNAc; ManNAc; PneuNAc) gave marginally different results with Anthrone or 2-PE reagents (FIG. 1).

Absorbance of Polysaccharides

Figure 2:
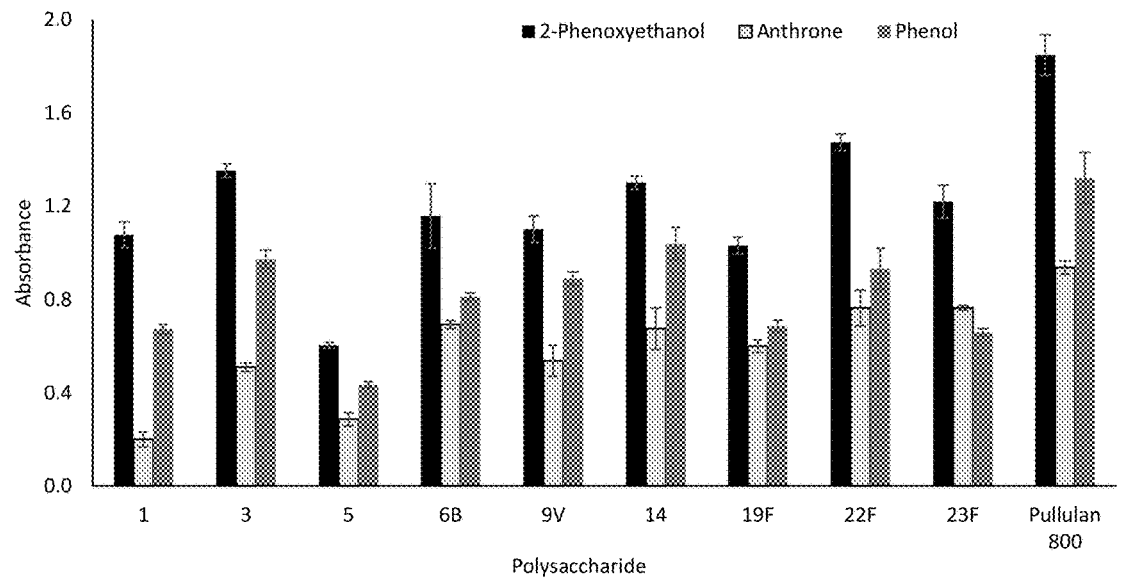
FIG. 2 illustrates Absorbance of polysaccharides (Pneumococcal polysaccharides, Pullulan 800 and Starch) upon reacting with 2-PE (500 nm), anthrone (625 nm) and Phenol (490 nm) reagents.

The absorbance of polysaccharides (Pneumococcal polysaccharides, Pullulan 800 and Starch) upon reacting with 2-PE (500 nm), anthrone (625 nm) and phenol (490 nm) reagents were illustrated in FIG. 2.

The sulphuric acid used for polysaccharide hydrolysis results in the formation of the hydroxymethylfurfural of each sugar. These hydroxymethyl furfurals when reacted with anthrone gave a green coloured complex with an absorbance maxima at 625 nm. Similarly, when hydroxymethyl furfurals reacted with 2-PE gave an orange-yellow coloured complex with an absorbance maxima at 500 nm. The sulphuric acid hydrolysed pneumococcal polysaccharides when reacted with 2-PE the colour complex formed was higher than that of the colour complex generated with anthrone reagent (FIG. 2) thus increasing the sensitivity for quantification and improving the lower LOD (Limit of Detection) of the sugars. Similar sensitivity and reactivity were also observed for other polysaccharides such as pullulan 800 using 2-PE (FIG. 2).

Example 2: Polysaccharide Quantification in Mono-Conjugate and Multivalent Adsorbed Vaccine Different known concentrations of pneumococcal serotype 6B and 7F Poly-protein conjugates each of 4-100 µg/mL and multivalent conjugate vaccine samples were subjected for 2-PE analysis. The percent recovery of 6B and 7F polysaccharide or conjugates were between 90-110%, above their LOQ (Limit of Quantification) level (Table 2).

Similarly, the percentage recovery of total polysaccharides in pneumococcal multivalent adsorbed conjugate vaccine at different $Al^{+3}$ concentrations (0.25, 0.5 and 1.0 mg/mL of $AlPO_4$ gel) were 97, 101 and 99 respectively (Table 2), indicating no interference from aluminium phosphate in the drug product.

Interference from Impurities and Validation

Figure 3:
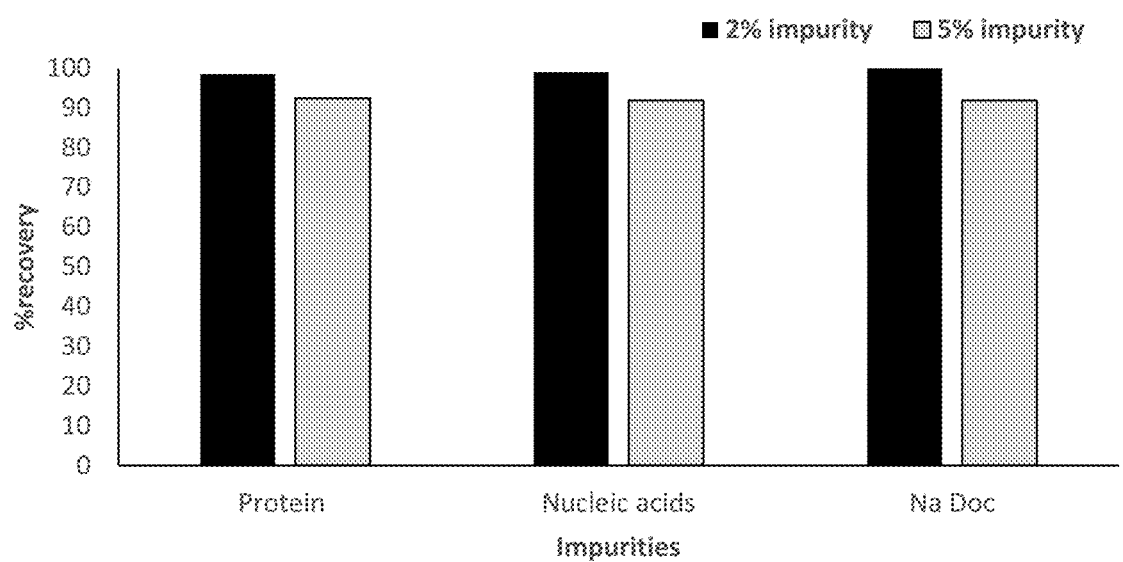
FIG. 3 illustrates absorbance of Pneumococcal polysaccharides as % recovery in presence of known impurities (2 and 5% w/v) present in purified polysaccharides.

The most common impurities in purified polysaccharides are nucleic acids, proteins and residual reagents. The interference of these impurities at 2 and 5% w/v level against total polysaccharide concentration were assessed using 2-PE reagent (FIG. 3) reactivity. At 2% impurities level (which is the maximum allowed limit as per regulatory guidance) there was no effect on the reactivity, however there was ~8% of less reactivity in presence of 5% impurities. Assay was validated for the specificity, accuracy, precision, spike recovery, limit of detection (LOD) and limit of quantification (LOQ) using polysaccharides and conjugates.

This method was further evaluated for polysaccharide quantification in vaccine conjugates. The polysaccharide concentration in 6B and 7F (Pneumo-CRM conjugates) were estimated at the entire standard range to check the assay LOD and LOQ (Table 2). Based on the % recovery of the polysaccharide or conjugates, the LOD of the assay was ≤4.0 µg/mL and LOQ of the assay was ≥8 µg/mL (Table 2). The source of the biological material used in the present invention is as follows:

1. *Streptococcus pneumoniae* Serotype 6B obtained from Centers for Disease Control and Prevention (CDC) USA
2. *Streptococcus pneumoniae* Serotype 7F obtained from Centers for Disease Control and Prevention (CDC) USA Further, Pneumo-CRM conjugates have been prepared using CRM197 protein isolated from *Corynebacterium* obtained from ATCC.

TABLE 2

Total polysaccharide content in 6B, 7F mono-conjugates and multivalent Pneumococcal conjugate vaccine by 2-PE method

| Sample Details | Expected Concentration (µg/mL) | Concentration by 2-PE method (µg/mL) | % Recovery of the total Ps content |
|---|---|---|---|
| 6B Polysaccharide | 4 | 2.8 | 69 |
| | 8 | 7.4 | 92 |
| | 16 | 14 | 90 |
| | 24 | 24 | 101 |
| | 32 | 34 | 107 |
| | 40 | 40 | 99 |
| | 100 | 100 | 100 |
| 6B mono-conjugate | 4 | 1 | 25 |
| | 8 | 8 | 100 |
| | 16 | 17 | 106 |
| | 24 | 22 | 92 |
| | 32 | 32 | 100 |
| | 40 | 40 | 100 |
| | 100 | 98 | 98 |
| 7F Polysaccharide | 4 | 0.1 | 3 |
| | 8 | 7.2 | 90 |
| | 16 | 15 | 94 |
| | 24 | 26 | 108 |
| | 32 | 35 | 110 |
| | 40 | 44 | 110 |
| | 100 | 97 | 97 |

TABLE 2-continued

Total polysaccharide content in 6B, 7F mono-conjugates and multivalent Pneumococcal conjugate vaccine by 2-PE method

| Sample Details | Expected Concentration (µg/mL) | Concentration by 2-PE method (µg/mL) | % Recovery of the total Ps content |
|---|---|---|---|
| 7F mono-conjugate | 4 | 1.2 | 30 |
|  | 8 | 7.3 | 91 |
|  | 16 | 15 | 94 |
|  | 24 | 23 | 96 |
|  | 32 | 32 | 100 |
|  | 40 | 40 | 100 |
|  | 100 | 102 | 102 |
| Multivalent vaccine with 0.25 mg/mL Al$^{+3}$ | 70 | 68 | 97 |
| Multivalent vaccine with 0.5 mg/mL Al$^{+3}$ | 70 | 71 | 101 |
| Multivalent vaccine with 1.0 mg/mL Al$^{+3}$ | 70 | 69 | 99 |

Advantages of the Invention

1. The method is simple and direct.
2. The method has a higher specificity and sensitivity over other methods known for quantification of carbohydrates.
3. The method can be used as a routine technique for quantifying a broad range of carbohydrates, sugars and/or polysaccharides in a wide range of samples.
4. The colour development in the developed method is not impaired by uronic acid containing polysaccharides.
5. The method of the present invention can accurately determine the amount of carbohydrates in presence of different impurities and formulation excipients, indicating the specificity of the assay.

The invention claimed is:

1. A method for quantification of carbohydrates in an aqueous sample, said method comprising the steps of:
    a. admixing sulphuric acid and 2-Phenoxyethanol with an aqueous sample containing carbohydrates to obtain a reaction mixture;
    b. incubating the reaction mixture to form a coloured complex; and
    c. measuring the absorbance of the coloured complex to quantify an amount of carbohydrates present in the aqueous sample.

2. The method as claimed in claim 1, wherein the absorbance of the coloured complex is measured at a wavelength ranging from 490 nm to 510 nm.

3. The method as claimed in claim 1, wherein a quantity of carbohydrate in the aqueous sample is proportional to the measured absorbance of the coloured complex.

4. The method as claimed in claim 1, wherein the carbohydrates are selected from a group comprising monosaccharides, disaccharides, polysaccharides, uronic acids, hexosamines, their derivatives and combinations thereof.

5. The method as claimed in claim 4, wherein the polysaccharide is selected from a group comprising Pneumococcal polysaccharides, Meningococcal polysaccharides, VI polysaccharide, and O2 polysaccharide.

6. The method as claimed in claim 1, wherein a volume of the sulphuric acid ranges from 1 to 3 times the volume of the aqueous sample.

7. The method as claimed in claim 1, wherein a concentration of 2-Phenoxyethanol in the reaction mixture ranges from 0.1% v/v to 2.5% v/v.

8. The method as claimed in claim 1, wherein the reaction mixture is incubated at a temperature ranging from 80° C. to 110° C. for a development of the coloured complex.

9. The method as claimed in claim 1, wherein the reaction mixture is incubated for a duration ranging from 1 minute to 10 minutes for development of the coloured complex.

10. A kit for quantifying carbohydrates in an aqueous sample comprising sulphuric acid, 2-Phenoxyethanol and a combination thereof.

* * * * *